United States Patent
Hick

(10) Patent No.: US 10,895,515 B2
(45) Date of Patent: Jan. 19, 2021

(54) METHODS AND APPARATUS FOR DETECTION OF LEAKS IN UNDERGROUND STORAGE TANKS

(71) Applicant: CGRS, Inc., Fort Collins, CO (US)

(72) Inventor: Eric L. Hick, Fort Collins, CO (US)

(73) Assignee: CGRS, Inc., Fort Collins, CO (US)

(*) Notice: Subject to any disclaimer, the term of this patent is extended or adjusted under 35 U.S.C. 154(b) by 0 days.

(21) Appl. No.: 16/353,923

(22) Filed: Mar. 14, 2019

(65) Prior Publication Data
US 2019/0285506 A1    Sep. 19, 2019

Related U.S. Application Data

(60) Provisional application No. 62/643,530, filed on Mar. 15, 2018.

(51) Int. Cl.
| | |
|---|---|
| *G01M 3/32* | (2006.01) |
| *G01M 3/00* | (2006.01) |
| *G01M 3/38* | (2006.01) |
| *H04N 7/18* | (2006.01) |

(52) U.S. Cl.
CPC .......... *G01M 3/3245* (2013.01); *G01M 3/005* (2013.01); *G01M 3/38* (2013.01); *H04N 7/185* (2013.01)

(58) Field of Classification Search
CPC .. B65D 90/501; B65D 90/105; B65D 90/505; B65D 88/76; B65D 88/54; B65D 90/028; G01M 3/3245; B67D 7/68; G01N 21/78; H04N 7/185
See application file for complete search history.

(56) References Cited

U.S. PATENT DOCUMENTS

| | | | |
|---|---|---|---|
| 4,732,035 A | 3/1988 | Lagergren et al. | |
| 4,852,054 A | 7/1989 | Mastandrea | |
| 5,152,859 A * | 10/1992 | Sharp | B65D 88/76 156/169 |
| 5,167,867 A | 12/1992 | Quaife et al. | |
| 5,184,504 A | 2/1993 | Spring | |
| 5,195,392 A | 3/1993 | Moore | |
| 5,518,553 A | 5/1996 | Moulder | |
| 5,736,821 A | 4/1998 | Suyama | |

(Continued)

OTHER PUBLICATIONS

U.S. Appl. No. 62/643,350, filed Mar. 15, 2018. First Named Inventor: Hick.

(Continued)

*Primary Examiner* — Obafemi O Sosanya
(74) *Attorney, Agent, or Firm* — Santangelo Law Offices, P.C.

(57) ABSTRACT

A system for the non-volumetric detection of low-threshold leaks with high resolution in underground storage tanks (USTs). A UST may be located underground with a restricted tank entry opening. The interior space of a UST may be accessed with a remotely controlled device. The presence of a liquid fill material or indicia thereof evidencing a leak may be visually observed. Variables affecting volumetric measurements of leak detection, such as temperature, pressure, tank deflection, and groundwater, may be eliminated or controlled. Visual observation may enable high resolution detection of low-threshold leaks.

20 Claims, 4 Drawing Sheets

(56) References Cited

U.S. PATENT DOCUMENTS

| | | | |
|---|---|---|---|
| 6,551,024 B1 * | 4/2003 | Berg, Sr. | B65G 5/00 |
| | | | 220/560.03 |
| 6,697,710 B2 | 2/2004 | Wilcox | |
| 7,283,892 B1 | 10/2007 | Boillot | |
| 7,461,541 B2 | 12/2008 | Adams et al. | |
| 7,594,448 B2 | 9/2009 | Jacobson et al. | |
| 8,024,066 B2 | 9/2011 | Reverte et al. | |
| 8,110,401 B2 | 2/2012 | Duerr | |
| 8,170,715 B1 | 5/2012 | Vallapuzha | |
| 8,521,453 B1 | 8/2013 | Silverman et al. | |
| 8,924,019 B2 | 12/2014 | Tang | |
| 9,220,386 B2 | 12/2015 | Gilbert, Jr. et al. | |
| 9,228,918 B2 | 1/2016 | Tunheim | |
| 9,383,055 B2 | 7/2016 | Hirose et al. | |
| 9,731,334 B2 | 8/2017 | Ervin | |
| 10,060,569 B2 | 4/2018 | Sivacoe | |
| 10,113,953 B2 | 10/2018 | Babin et al. | |
| 10,132,713 B2 | 11/2018 | Choi et al. | |
| 2005/0247111 A1 * | 11/2005 | Hutchinson | B67D 7/3209 |
| | | | 73/40.5 R |
| 2005/0252296 A1 * | 11/2005 | Hock | G01N 29/225 |
| | | | 73/623 |
| 2010/0003741 A1 | 1/2010 | Fromson | |
| 2010/0023162 A1 * | 1/2010 | Gresak | G07F 13/025 |
| | | | 700/241 |
| 2010/0288019 A1 * | 11/2010 | Simmons | G01M 3/2892 |
| | | | 73/40.5 R |
| 2016/0123517 A1 | 5/2016 | Hirose et al. | |

OTHER PUBLICATIONS

Minicam Inpipe Innovation. Performance Wheels. https://www.minicam.co.uk/proteus-wheels. Mini-Cam Ltd. Mar. 14, 2019. 3 pages.

* cited by examiner

METHODS AND APPARATUS FOR DETECTION OF LEAKS IN UNDERGROUND STORAGE TANKS

This application claims the benefit of and priority to U.S. Provisional Application No. 62/643,530, filed Mar. 15, 2018, such patent application and any priority case hereby incorporated herein by reference in its entirety

BACKGROUND

The present inventive technology relates to the field of detection of leaks in underground storage tanks. It may involve the utilization of high-resolution, non-volumetric detection techniques that may be particularly applicable to detecting low-threshold leaks otherwise difficult or impossible to detect with conventional low-resolution, volumetric detection techniques.

Underground storage tanks ("USTs") may be a widely used containment technology for storing various kinds of materials partially or wholly under the surface of the ground. Often, such contained materials stored in USTs may be hazardous, dangerous to health, environmentally harmful, or otherwise subject to government regulation. Leaks of such contained materials from USTs therefore may present a significant concern and issue.

One technique for combatting such leaks may be to build USTs having a dual containment structure. For example, in some configurations, a first cylindrical inner tank structure may be disposed within a second cylindrical outer tank structure. This configuration may deter leaks by establishing two physical barriers that the contained material would have to breach in order for a leak to contaminate the surrounding environment.

Such a dual containment structure also may provide a way for detecting leaks. For example, the annular space between a first cylindrical inner tank structure and a second cylindrical outer tank structure may be filled with a liquid until the space is fully inundated. Liquid may continue to be added so as to additionally fill a column or similar structure that is in liquid communication with the annular space. For example, USTs typically may be provided with a column having an 18 inch or similar diameter, with "high" and "low" marks by which to gauge changes in liquid level. If there is a leak in either the first cylindrical inner tank structure or the second cylindrical outer tank structure, it may be appreciated that the liquid escaping through the leak may cause the level of the liquid in the annular space to drop, which in turn may cause the level of the liquid in the column to drop. It therefore may be seen that a leak may be detected by observing a drop in the level of liquid in the column.

Government regulations typically may set the minimum rate of leakage that must be able to be detected in USTs. For example, in 2018, the California Code of Regulations at Title 23, Division 3, Chapter 16, Article 4, § 2644.1 was revised to specify that the State of California requires USTs to be tested to detect a leak rate of 0.005 gallons per hour as liquid, with a probability of detection of at least 95% and a probability of false alarm no greater than 5%. This leak rate is believed to be the strictest standard set by government regulation in the United States and to set a threshold well below any other leak rate currently established by government regulation. In typical applications, this leak rate may be approximated as comprising about one drop of liquid leaked every seven seconds.

As a result of the revised standard set forth in the California regulation, conventional methods of detecting leaks in USTs may have become inadequate to detect leaks in compliance therewith. For example, volumetric testing techniques, such as observing a drop in the level of liquid in a column, simply may not have enough resolution to detect leaks at the lowered threshold of the California regulation. The resolution of such volumetric testing techniques may be compromised by factors such as temperature differences (both within different parts of the tank as well as between the tank interior and the outside environment), pressure differences (again, both within different parts of the tank as well as between the tank interior and the outside environment), tank deflection, barometric pressure, groundwater effects, and the like. Each of these factors independently may cause a change in the observed level of a liquid in a column. While such changes may not have been outcome-determinative for higher threshold leak detection standards preceding the California regulation, the lower threshold leak detection standard of the California regulation means such changes now may, for example, mask observed level changes attributable to actual leaks, thus potentially producing inaccurate test results for these kinds of volumetric-based measurements.

The foregoing problems related to conventional volumetric leak detection testing for USTs may represent a long-felt need for an effective solution to the same. While implementing elements may have been available, actual attempts to meet this need may have been lacking to some degree. This may have been due to a failure of those having ordinary skill in the art to fully appreciate or understand the nature of the problems and challenges involved. As a result of this lack of understanding, attempts to meet these long-felt needs may have failed to effectively solve one or more of the problems or challenges here identified. These attempts may even have led away from the technical directions taken by the present inventive technology and may even result in the achievements of the present inventive technology being considered to some degree an unexpected result of the approach taken by some in the field.

SUMMARY OF THE INVENTIVE TECHNOLOGY

In one embodiment, an object of the inventive technology may be to provide a method for the high resolution detection of a low-threshold leak in an underground storage tank ("UST") comprising the steps of deploying a remotely controlled device through a restricted tank entry opening into an interior space of an underground storage tank, the underground storage tank comprising an exterior wall of a double-wall tank construction, an interior wall of a double-wall tank construction, an interstitial space disposed between the exterior wall and the interior wall of the double-wall tank construction, a liquid fill material disposed within the interstitial space, a low-threshold leak equal to or exceeding 0.005 gallons per hour of leaked liquid disposed through the interior wall of the double-wall tank construction, and wherein the underground storage tank is located underground, and maneuvering the remotely controlled device within the interior space of the underground storage tank, remotely visually inspecting the interior space of the underground storage tank with a camera of the remotely controlled device, remotely visually observing the presence of the liquid fill material or indicia of the liquid fill material within the interior space of the underground storage tank, and non-volumetrically detecting the leak with high resolution as a result of the step of visually observing the presence of the liquid fill material or indicia of the liquid fill material within the interior space of the underground storage tank. Naturally, further objects of the inventive technology will become apparent from the description and drawings below.

DETAILED DESCRIPTION OF THE PREFERRED EMBODIMENTS

Figure 1:
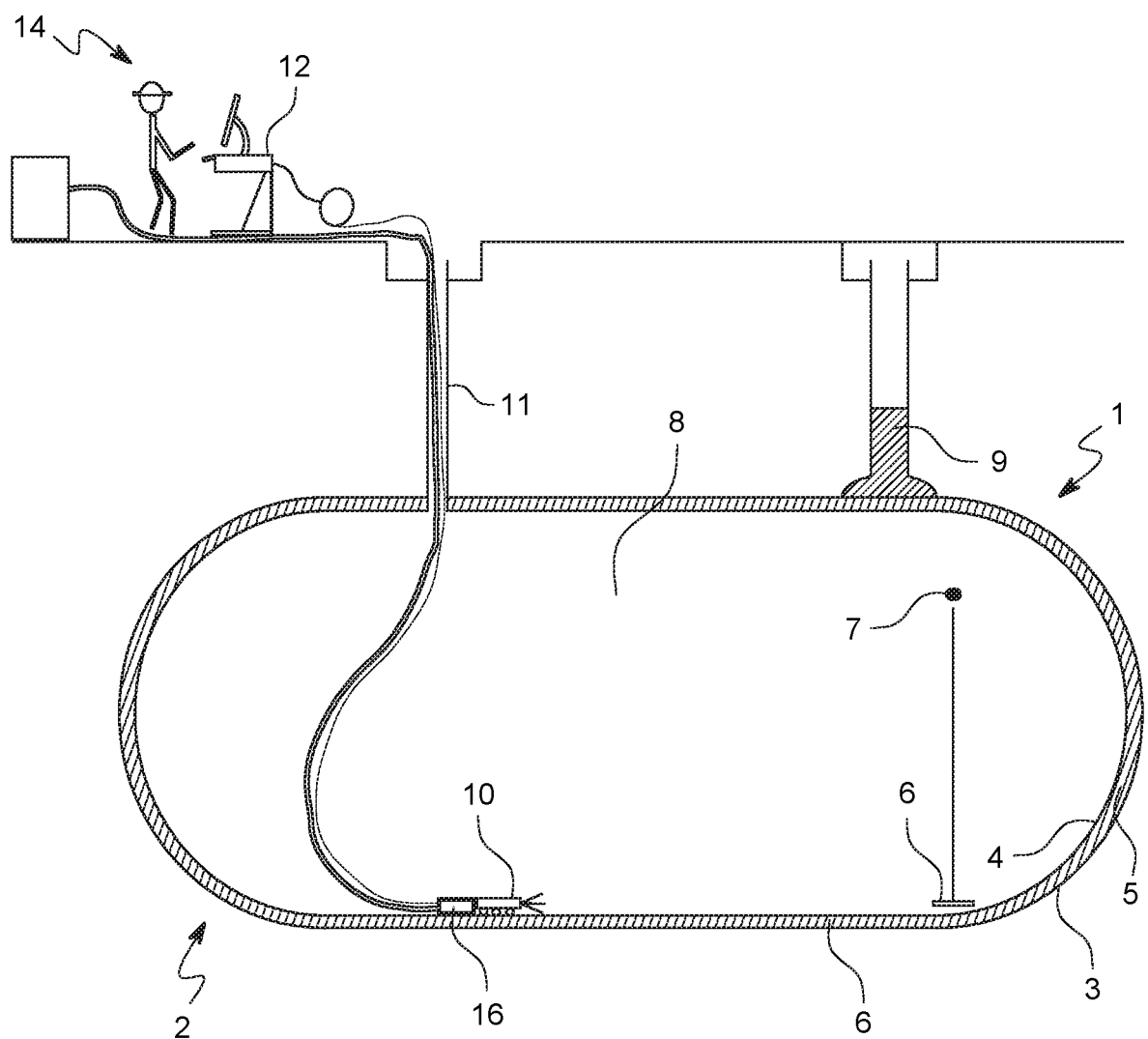
FIG. 1 shows various system processes and devices in the context of a side view of an underground storage tank in an exemplary embodiment.
Figure 2:
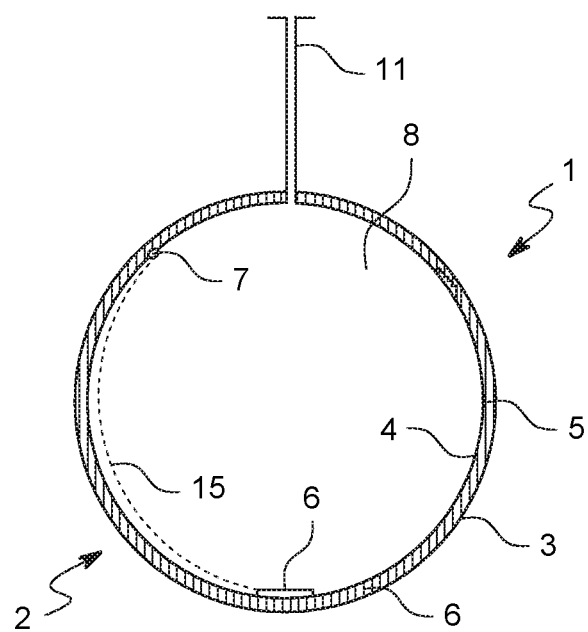
FIG. 2 shows various system processes and devices in the context of an end view of an underground storage tank in an exemplary embodiment.
Figure 3:
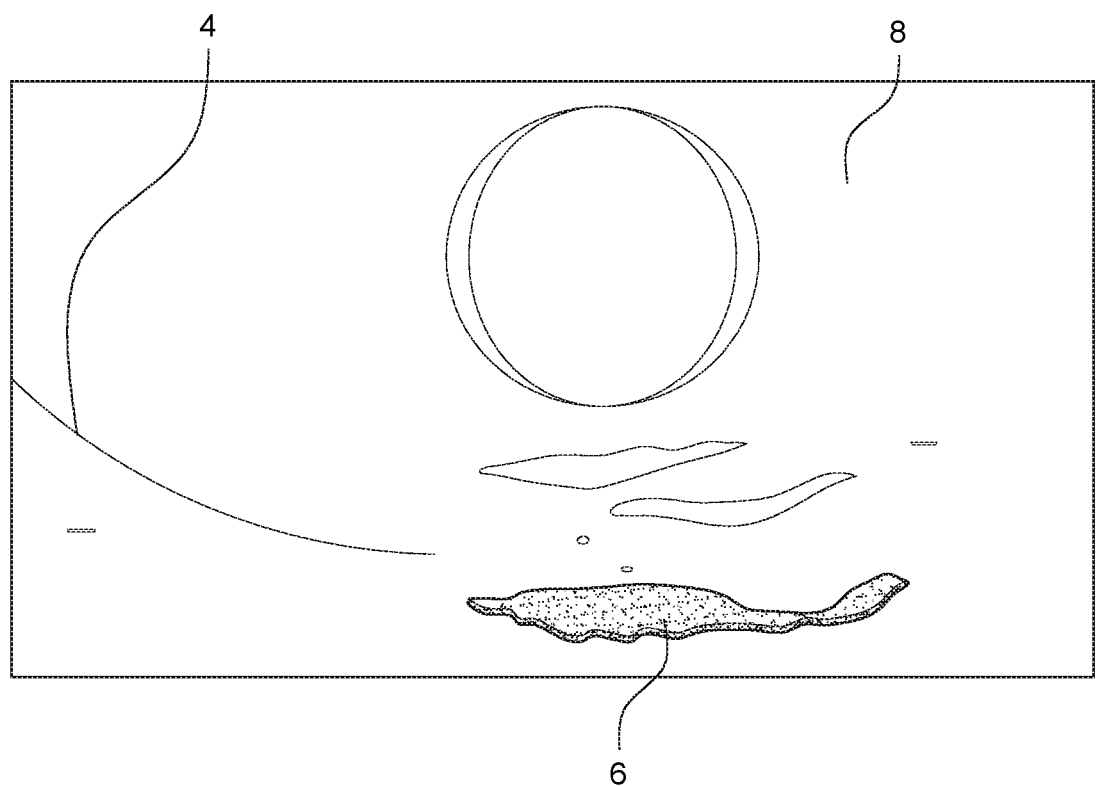
FIG. 3. is an illustration of the presence of liquid fill material within the interior space of an underground storage tank in one exemplary embodiment.
Figure 4:
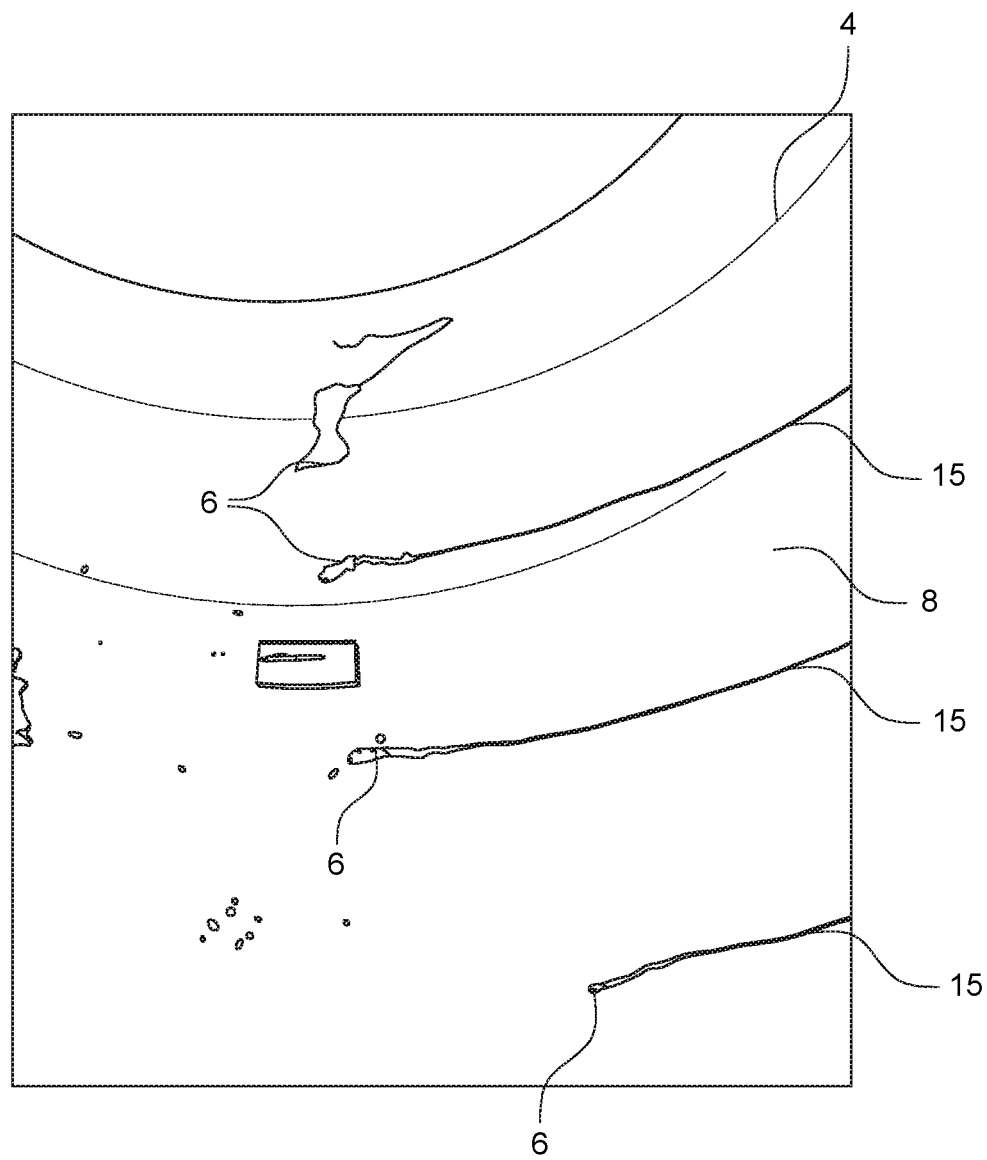
FIG. 4 is an illustration of the presence of liquid fill material and indicia of liquid fill material within the interior space of an underground storage tank in one exemplary embodiment.
Figure 5:
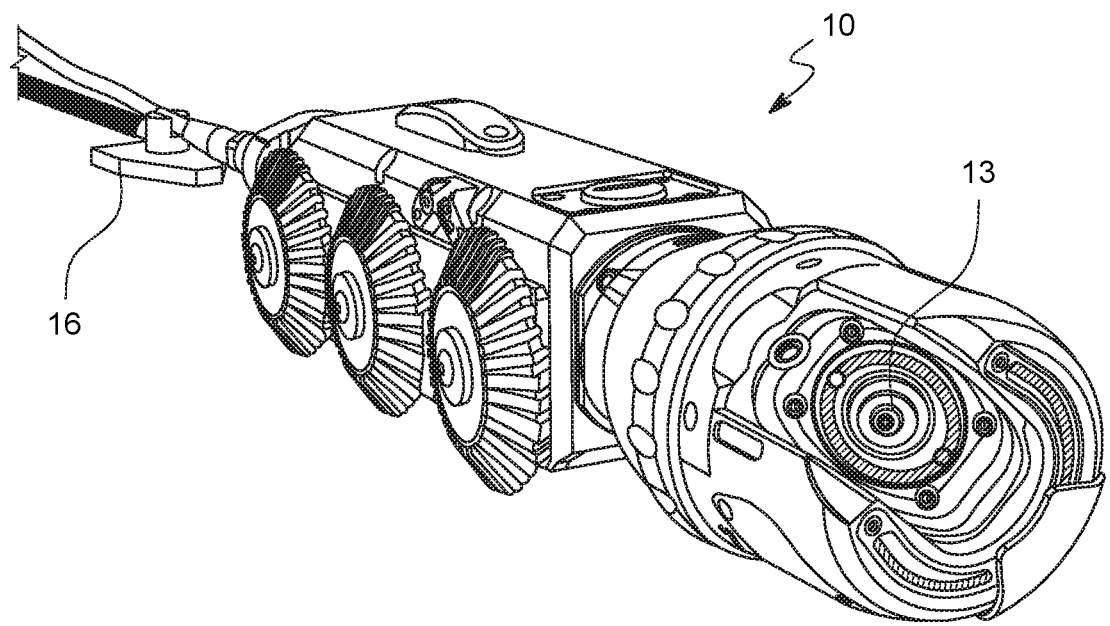
FIG. 5 is an illustration of a remotely controlled device in a first exemplary embodiment.
Figure 6:
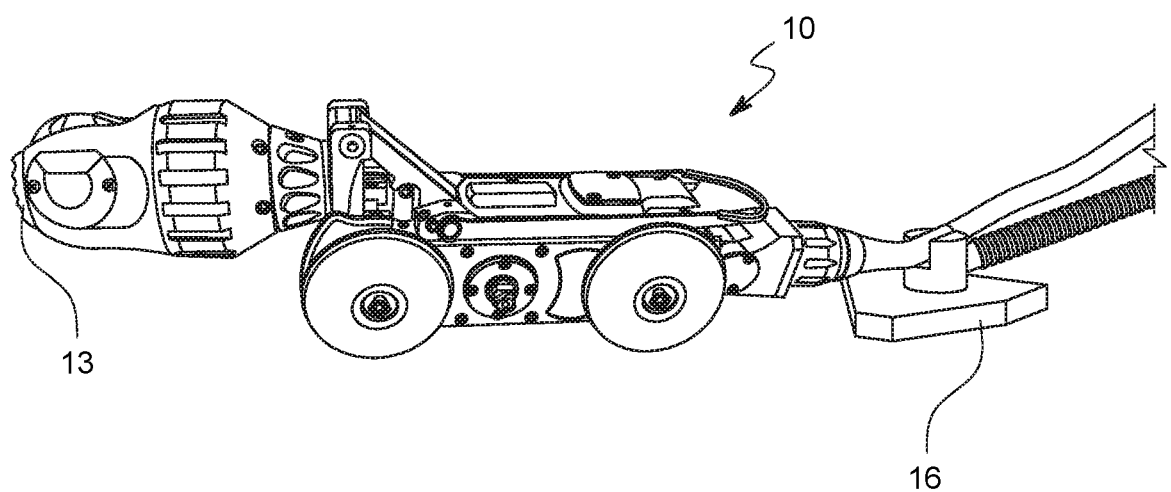
FIG. 6 is an illustration of a remotely controlled device in a second exemplary embodiment.

As mentioned earlier, the present inventive technology includes a variety of aspects, which may be combined in different ways. The following descriptions are provided to list elements and describe some of the embodiments of the present inventive technology. These elements are listed with initial embodiments; however, it should be understood that they may be combined in any manner and in any number to create additional embodiments. The variously described examples and preferred embodiments should not be construed to limit the present inventive technology to only the explicitly described systems, techniques, and applications. The specific embodiment or embodiments shown are examples only. The specification should be understood and is intended as supporting broad claims as well as each embodiment, and even claims where other embodiments may be excluded. Importantly, disclosure of merely exemplary embodiments is not meant to limit the breadth of other more encompassing claims that may be made where such may be only one of several methods or embodiments which could be employed in a broader claim or the like. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

In various embodiments, the inventive technology may involve a method for detecting a leak in an underground storage tank ("UST").

A UST (1) may have a double-wall tank construction (2) having at least an exterior wall (3), an interior wall (4), and an interstitial space (5) disposed between the exterior wall (3) and the interior wall (4). The double-wall tank construction (2) and its constituent parts may be of any suitable shape, size, layout, or other configuration consistent with the inventive principles discussed herein sufficient to hold a material to be contained within the UST within a primary containment and a secondary containment, for example wherein the interior wall (4) may be a primary containment and the exterior wall (3) may be a secondary containment.

A liquid fill material (6) may be disposed within the interstitial space (5) in various embodiments. The interstitial space may be of any suitable configuration consistent with the inventive principles described herein sufficient to contain, partially or wholly, a liquid fill material (6), and may separate, partially or wholly, an interior wall (4) from an exterior wall (3) in any suitable configuration or manner consistent with the inventive principles described herein. Any liquid material suitable to partially or wholly fill the interstitial space (5) consistent with the inventive principles discussed herein may be utilized. For example, a liquid fill material (6) in various embodiments may be a liquid that can be differentiated and distinguished from a contained material to be held within the UST (1) and/or from liquids found in the environment in which the UST (1) is placed. In some embodiments, the liquid fill material (6) may be a brine.

In various embodiments, the UST (1) may be located underground, which may include being partially or wholly submerged beneath the surface of the ground to any desirable depth.

The UST (1) in various embodiments may have one or more leaks (7) disposed through an interior wall (4) of the double-wall tank construction (2). A leak (7) may be an opening, such as a hole, crack, or the like, through which liquid may pass. For example, the leak (7) may allow liquid material contained within an interior space (8) of the UST (1) to pass into the interstitial space (5), and/or liquid fill material (6) to pass from the interstitial space (5) into the interior space (8) of the UST (1).

A method for detecting a leak in various embodiments may involve accessing one or more interior spaces (8) of the UST (1). Such interior space or spaces (8) may be of any suitable shape, size, layout, or other configuration consistent with the inventive principles discussed herein and may lie wholly or partly within the interior wall (4) of the double-wall tank construction (2). Accessing the interior space (8) generally may involve the ability to place and/or retrieve an object or the like into the interior space (8) from outside of the interior space (8).

A method for detecting a leak in various embodiments may involve performing an inspection of the interior space (8) of the UST (1) from within the interior space (8). The inspection may involve any act of inspecting suitable to identify the presence or absence of a leak (7) disposed through an interior wall (4) of a double-wall tank construction (2) consistent with the inventive principles described herein. For example, in various embodiments, inspections may be relatively comprehensive in nature, such as by physically roaming some or all of the accessible surfaces of the interior wall (4), or may be relatively minimally intrusive, such as by viewing the surfaces of the interior wall (4) from a stationary location.

A method for detecting a leak in various embodiments may involve non-volumetrically detecting the leak (7) disposed through an interior wall (4) of a double-wall tank construction (2) from within the interior space (4). Detection of a leak (7) may involve confirming its presence or absence with reasonable certainly, such as to a standard of probability of at least 95% and a probability of false alarm no greater than 5%. Non-volumetrically detecting the leak (7) may involve methods of detection not utilizing volumetric detection techniques, for example, not utilizing the observation of the change in level for a liquid in a volumetric space, such as the level of a liquid in a liquid fill reservoir (9) or the like.

In some embodiments, accessing an interior space (8) of a UST (1) may involve deploying a remotely controlled device (10) into the interior space (8). Deployment may involve making the remotely controlled device (10) ready for use within the interior space (8), and any device capable of being deployed into the interior space (8) and remotely controlled from outside of the interior space (8) consistent with the inventive principles described herein may be utilized. Examples of a remotely controlled device (10) may include ground vehicles, aerial vehicles, stationary objects such as may be dropped into place, one or more such devices working in concert, and the like.

In some embodiments, the remotely controlled device (10) may have attributes and capabilities specifically suited for working within the interior space of a UST (1). For example, USTs (1) often may have an interior surface made of a smooth material such as fiberglass, and a ground vehicle may be provided with wheels having sufficient grip and ground clearance to engage such smooth surfaces and navigate the curved surface of the UST (1) interior and any obstacles therein. Similarly, the interior space (8) of a UST (1) naturally may present limited space through which aerial vehicles can maneuver, so an aerial vehicle may be provided with rotors for stationary hovering or the like. By way of further example, a stationary object may be provided with a movable mount by which a sensor can be oriented to survey the interior of the UST (1). In some embodiments, a remotely controlled device (10) may be a Proteus CRP90, perhaps with modifications suitable for maneuvering within the interior space (8) of a UST (1).

Deployment of a remotely controlled device (10) may be made through a restricted tank entry opening (11) of a UST (1). A restricted tank entry opening (11) may be an opening providing entry to the interior space (8) of a UST (1) that may be restricted in configuration and size, for example as might limit the possible configurations and sizes of a remotely controlled device (10) sought to be admitted therethrough. This often may be the case for a UST (1) located wholly underground, where access to the interior space (8) of the UST (1) typically may be limited to that of a restricted tank entry opening (11) connecting the interior space (8) of the UST (1) to the surface of the ground. In some embodiments, for example, a restricted tank entry opening (11) may be circular opening having a diameter no greater than about 4 inches.

In some embodiments, performing an inspection of the interior space (8) of a UST (1) may involve maneuvering the remotely controlled device (10) within the interior space (8). For example, a ground vehicle may be remotely driven across the surface of the interior space (8), and aerial vehicle may be remotely piloted through the volume of the interior space (8), a mount of a stationary object may be remotely rotated to survey the interior space (8), and the like.

In some embodiments, performing an inspection of the interior space (8) of a UST (1) may involve remotely inspecting using an optical sensor of a remotely controlled device (10). Remotely inspecting may involve performing an inspection wherein a remotely controlled device (10) may be within the interior space (8) of a UST (1), and an inspector may be outside of the interior space (8) of the UST (1). Any suitable means of communication between the remotely controlled device (10) within the interior space (8) and an inspector (be it a human operator or an automated device) located outside the interior space (8) may be utilized consistent with the inventive principles described herein, such as wired or wireless communication, and such as between the remotely controlled device (10) and a control device (11) operated by an inspector.

An optical sensor in various embodiments may be any sensor capable of sensing utilizing the principles of optics. In some embodiments, an optical sensor may be a camera (13), and performing an inspection may involve remotely visually inspecting with a camera (13) of a remotely controlled device (10). Remotely visually inspecting may involve a visual inspection of the interior space (8) from there within using the remotely controlled device (10), with the images from the camera being communicated to a remote location (14) outside of the interior space (8). For example, a ground vehicle may be remotely driven so as to allow the camera to image various surfaces of the interior space (8), an aerial vehicle may be remotely piloted so as to allow the camera to image various surface of the interior space (8), a camera mount of a stationary object may be rotated so as to allow the camera to image various surfaces of the interior space (8), and so forth. The images from the camera naturally may be communicated to the remote location (14) of the inspector, and any camera or optical sensor may be utilized consistent with the inventive principles disclosed herein.

In various embodiments, non-volumetrically detecting a leak (7) may involve remotely visually observing the presence of liquid fill material (6) within the interior space (8) of a UST (1). A leak (7) may permit the ingress of liquid fill material (6) from interstitial space (5) to the interior space (8) of the UST (1). If no leak (7) is present, it may be impossible or highly improbable that liquid fill material (6) could make such an ingress. Therefore, visually observing the presence of liquid fill material (6) within the interior space (8) of a UST (1) may be assumed to be highly indicative of the presence of a leak (7) in the interior wall (4), and a leak (7) thereby may be detected. Examples of visually observed liquid fill material (6) may include drops, puddles, pools, or the like. Moreover, the nature of this kind of detection may be seen to be non-volumetric, as no volumetric measurements or other kinds of volumetric techniques are used to detect the leak (7), as may be the case, for example, when utilizing the observation of the change in level for a liquid in a volumetric space, such as the level of a liquid in a liquid fill reservoir (9) or the like. Additionally, visually observing the presence of a liquid fill material (6) may have benefits over volumetric techniques to detect a leak (7), for example in as much as volumetric techniques only indirectly test for a leak (7), whereas visual observation of a leak (7) is a direct method of viewing the leak. This may provide information about the leak (7) unavailable from the indirect evidence provided by volumetric measurement, such information perhaps including things such as the location of the leak (7) in the interior space (8), the size and shape of the leak (7), and the like.

In some embodiments, the liquid fill material (6) may be selected to have an attribute, for example a color, such as to aid in sensing or visually observing the liquid fill material (6) within the interior space (8) of the UST (1). Any attribute consistent with the inventive principles disclosed herein suitable to aid in such sensing or visually observing may be utilized. For example, a color different from and/or that may stand out from the typical colors of the interior space (8) may make the liquid fill material (6) easier to detect therein. This may be particularly helpful, for example, in detecting the liquid fill material (6) when it is present only in small amounts. In some embodiments, the liquid fill material (6) already may have the desired color prior to starting the inspection, and in other embodiments color may be added to the liquid fill material (6) prior to or during the inspection process. Any suitable color or property of color may be utilized consistent with the inventive principles herein described, such as bright colors, contrasting colors, colors that fluoresce, and the like. Accordingly, non-volumetrically detecting a leak (7) in some embodiments may involve remotely visually observing a color within the interior space (8) of the UST (1).

In some embodiments, non-volumetrically detecting a leak (7) may involve visually observing indicia (15) of the liquid fill material (6) within the interior space (8) of the UST, for example such as wherein actual liquid fill material (6) itself may not be directly observed. Examples of such indicia (15) may include streaks, marks, deposits, or other indirect indicators of the presence of liquid fill material (6), perhaps even where no liquid fill material (6) itself is directly observed.

Non-volumetrically detecting a leak (7) in various embodiments may involve non-volumetrically detecting a low-threshold leak (7). A threshold for detecting a leak (7) may be considered to become lower as the leak rate decreases, for example wherein increasingly slower leak rates may make the leak (7) more difficult to detect. In various embodiments, a low-threshold leak (7) may be a leak (7) having a leak rate slower than or otherwise below that specified by government regulation applicable to the testing of USTs (1) prior to the enactment of § 2644.1 of the California Code of Regulations earlier described herein, which may include leak rates from that level down to a leak rate of 0.005 gallons per hour as liquid, and which also may include leak rates which cannot be accurately or reliably measured by utilizing volumetric detection techniques, for example, utilizing the observation of the change in level for a liquid in a volumetric space, such as the level of a liquid in a liquid fill reservoir (9) or the like. Accordingly, in some embodiments non-volumetrically detecting a low-threshold leak (7) may involve non-volumetrically detecting a leak (7) equal to or exceeding 0.005 gallons per hour of leaked liquid.

In some embodiments, non-volumetrically detecting a leak (7) may involve non-volumetrically detecting a leak (7) with high resolution. A resolution for detecting a leak (7) may be considered to become higher as the ability of the detection method to resolve increasingly small increments of the amount of leaked liquid increases.

To detect a leak (7), the resolution of the detection method may need to be equal to or greater than the threshold of the leak (7) to be detected. For example, to detect a leak (7) having a threshold of 0.005 gallons per hour of leaked liquid, it may be necessary for the detection method to be able to resolve increments of the amount of leaked liquid at or below increments of 0.005 gallons, because resolving increments of the amount of leaked liquid at a lower resolution, such as at or above 0.006 gallon increments, may miss detection of a 0.005 gallon amount of leaked liquid.

As the resolution of the method of leak detection increases, increasingly lower thresholds of leaks (7) may become detectable. In some embodiments, non-volumetrically detecting a leak with high resolution may involve non-volumetrically detecting a low threshold leak. This may include a threshold of equal to or exceeding 0.005 gallons per hour of leaked liquid, such as may be set forth in § 2644.1 of the California Code of Regulations earlier described herein. However, it may be understood that the resolution of leak detection may be increased given a longer soak time of the interstitial space (5) with the liquid fill material (6) to be used for testing. For example, in some embodiments it may be possible to detect a low-threshold leak of up to 0.0005 gallons per hour of leaked liquid given a five hour soak time.

In some embodiments, non-volumetrically detecting a leak (7) with high resolution may involve non-volumetrically detecting a leak (7) with greater resolution as compared to volumetrically detecting a leak (7), for example with greater resolution as compared to detecting a leak (7) by observing a change in the level of a liquid fill reservoir (9) of a UST (1). For example, remotely visually observing the presence of liquid fill material (6) within the interior space (8) of a UST (1) may provide higher resolution than observing a change in the level of a liquid fill reservoir (9), in as much as this may be direct observation of liquid actually leaked, and not simply observation of a reservoir level change as indirect evidence of a leak (7). It may be the case that volumetric methods for detecting leaks may not have the ability to reliably and accurately detect low-threshold leaks, for example at a threshold of 0.005 gallons per hour as liquid, with a probability of detection of at least 95% and a probability of false alarm no greater than 5%. By way of contrast, visually observing the presence of liquid fill material (6) may allow detection of low-threshold leaks (7), such as at a threshold of 0.005 gallons per hour, because it may be possible to detect even very small amounts of liquid fill material (6) through visual observation, perhaps even amounts smaller than would be reliably and accurately reflected in the change in the level of a liquid fill reservoir (9).

Moreover, non-volumetrically detecting a leak (7) with high resolution may involve controlling for or possibly even eliminating a variable that may affect the reliability and accuracy of volumetric measurement.

For example, the reliability and accuracy of volumetric measurement may be affected by pressure, which can affect, for example, volumetric measurements such as the level of a liquid in a liquid fill reservoir (9). The sources of such pressure may come from, for example, inter-tank pressure difference (such as wherein different pressures may exist within a UST (1) and outside of the UST (1)), intra-tank pressure difference (such as wherein different pressures may exist within different parts of a UST (1)), barometric pressure (such as pressure from the ambient environment of a UST (1), for example atmospheric pressure, which may fluctuate over time), and the like.

Similarly, the reliability and accuracy of volumetric measurement may be affected by temperature, which also can affect, for example, volumetric measurements such as the level of a liquid in a liquid fill reservoir (9). The sources of such temperature may come from, for example, inter-tank temperature difference (such as wherein different temperatures may exist with a UST (1) and outside of the UST (1)), intra-tank temperature difference (such as wherein different temperatures may exist within different parts of a UST (1)), ambient temperature (temperature from the ambient environment of a UST (1), such as air temperature or ground temperature, which may fluctuate over time), and the like.

Moreover, the reliability and accuracy of volumetric measurement may be affected by changes in tank deflection, for example wherein the position or orientation of a UST (1) may change over time, which can affect, for example, volumetric measurements such as the level of a liquid in a liquid fill reservoir (9). The sources of such tank deflection may include, for example, shifts in the ground mass, for example due to manmade factors such as nearby construction or earth moving, or geological factors such as subsidence or slump, or the like.

The reliability and accuracy of volumetric measurement also may be affected by environmental factors. For example, change in the level or flow of groundwater in the environment of the UST (1) can themselves create or compound effects such as temperature or tank deflection, which can affect the reliability and accuracy of volumetric measurement such as the level of a liquid in a liquid fill reservoir (9).

Of course, the foregoing variables are only examples of some factors illustrating that the reliability and accuracy of volumetric measurements, such as the level of a liquid in a liquid fill reservoir (9), readily may be compromised. Under field conditions, a great variety of variables similarly may lead to such compromise of volumetric measurement, which may result in perhaps inaccurate leak detection in USTs (1), particularly in the detection of low-threshold leaks such as at the threshold mandated in § 2644.1 of the California Code of Regulations as earlier described herein. Because the inventive technology discloses non-volumetric techniques for detecting a leak (7), such techniques should be understood to address and perhaps overcome most or all of such shortcomings of volumetric measurements that may lead to compromise in the reliability and accuracy of leak detection.

In some embodiments, non-volumetrically detecting a leak (7) may involve non-volumetrically detecting the leak (7) at or later than 30 minutes from initiating a soak time of an interstitial space (5) of a UST (1). A soak time may be the time required for an interstitial space (5) to be soaked with liquid fill material (6) before a leak (7) may become detectable. For example, if an interstitial space (5) of a UST is empty, or is filled with liquid unsuitable for testing for leaks (7), such as for example when color may need to be added, then the interstitial space (5) may be soaked with an appropriate liquid fill material (6) to test for leaks (7) and a soak time may be initiated.

A soak time of as little as 30 minutes may be shorter than the soak time that would be required if volumetric leak detection were employed. For example, a low-threshold leak may produce such little change in a volumetric measurement, such as the change in the level of a liquid fill reservoir (9) of a UST (1), that the change may escape notice, or the change may be masked by one or more variables such as pressure, temperature, tank deflection, environmental factors, or the like. For this reason, volumetric measurement may require longer soak times to detect leaks (7), as wherein the amount of leaked liquid may be required to build over time to a point where it can be reliably and accurately observed by a volumetric measurement.

A method for detecting a leak in various embodiments may involve the step of removing liquid from the interior space (8), such as with a remotely controlled device (10). For example, a remotely controlled device (10) may be provided with an implement (16) capable of such liquid removal, such as a vacuum, absorbent material, or the like. Liquid removal may be done for any suitable purpose consistent with the inventive principles described herein, such as tank cleaning, tank maintenance, removing liquid that interferes with non-volumetrically detecting a leak, and the like.

As can be easily understood from the foregoing, the basic concepts of the present inventive technology may be embodied in a variety of ways. It involves both non-volumetric leak detection techniques as well as devices to accomplish the appropriate non-volumetric leak detection. In this application, the non-volumetric leak detection techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this patent application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of an "inspection" should be understood to encompass disclosure of the act of "inspecting"—whether explicitly discussed or not—and, conversely, were there effectively disclosure of the act of "inspecting", such a disclosure should be understood to encompass disclosure of an "inspection" and even a "means for inspecting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any acts of law, statutes, regulations, or rules mentioned in this application for patent; or patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the list of References To Be Incorporated By Reference or other information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the non-volumetric leak detection devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method for the high resolution detection of a low-threshold leak in an underground storage tank comprising the steps of:
    deploying a remotely controlled device through a restricted tank entry opening into an interior space of an underground storage tank, said underground storage tank comprising:
      an exterior wall of a double-wall tank construction;
      an interior wall of a double-wall tank construction;
      an interstitial space disposed between said exterior wall and said interior wall of said double-wall tank construction;
      a liquid fill material disposed within said interstitial space;
      a low-threshold leak as low as 0.005 gallons per hour of leaked liquid disposed through said interior wall of said double-wall tank construction;
    and wherein said underground storage tank is located underground;
    maneuvering said remotely controlled device within said interior space of said underground storage tank;
    remotely visually inspecting said interior space of said underground storage tank with a camera of said remotely controlled device;
    remotely visually observing the presence of said liquid fill material or indicia of said liquid fill material within said interior space of said underground storage tank;
    non-volumetrically detecting said leak with high resolution as a result of said step of visually observing the presence of said liquid fill material or indicia of said liquid fill material within said interior space of said underground storage tank, wherein said step of non-volumetrically detecting said leak with high resolution comprises the step of detecting said low-threshold leak as low as 0.005 gallons per hour of leaked liquid as soon as 30 minutes from initiating a soak time of said interstitial space with said liquid fill material.

2. A method for the high resolution detection of a low-threshold leak in an underground storage tank as described in claim 1 wherein said step of non-volumetrically detecting said leak with high resolution comprises the step of non-volumetrically detecting said leak with greater resolution as compared to detecting said leak by observing a change in the level of a liquid fill reservoir of said underground storage tank.

3. A method for the high resolution detection of a low-threshold leak in an underground storage tank as described in claim 1 wherein said step of non-volumetrically detecting said leak with high resolution comprises the step of controlling for a variable selected from the group consisting of inter-tank temperature difference, intra-tank temperature difference, inter-tank pressure difference, intra-tank pressure difference, tank deflection, barometric pressure, groundwater, and any combination of the foregoing.

4. A method for detecting a leak in an underground storage tank comprising the steps of:
    accessing an interior space of said underground storage tank, said underground storage tank comprising:
      an exterior wall of a double-wall tank construction;
      an interior wall of a double-wall tank construction;
      an interstitial space disposed between said exterior wall and said interior wall of said double-wall tank construction;
      a liquid fill material disposed within said interstitial space;
      a low-threshold leak as low as 0.005 gallons per hour of leaked liquid disposed through said interior wall of said double-wall tank construction;
    and wherein said underground storage tank is located underground;
    performing an inspection of said interior space of said underground storage tank;
    non-volumetrically detecting said leak disposed through said interior wall of said double-wall tank construction from within said interior space as a result of performing said inspection and with high resolution, wherein said step of non-volumetrically detecting said leak with high resolution comprises the step of detecting said low-threshold leak as low as 0.005 gallons per hour of leaked liquid as soon as 30 minutes from initiating a soak time of said interstitial space with said liquid fill material.

5. A method for detecting a leak in an underground storage tank as described in claim 4 wherein said step of accessing comprises the step of deploying a remotely controlled device into said interior space of said underground storage tank.

6. A method for detecting a leak in an underground storage tank as described in claim 5 wherein said step of deploying comprises the step of deploying said remotely controlled device through a restricted tank entry opening.

7. A method for detecting a leak in an underground storage tank as described in claim 6 wherein said restricted tank entry opening comprises a circular opening having a diameter no greater than 4 inches.

8. A method for detecting a leak in an underground storage tank as described in claim 5 wherein said step of performing an inspection comprises the step of maneuvering said remotely controlled device within said interior space of said underground storage tank.

9. A method for detecting a leak in an underground storage tank as described in claim 5 wherein said step of performing an inspection comprises the step of remotely inspecting using an optical sensor of said remotely controlled device.

10. A method for detecting a leak in an underground storage tank as described in claim 9 wherein said step of remotely inspecting using an optical sensor comprises the step of remotely visually inspecting with a camera of said remotely controlled device.

11. A method for detecting a leak in an underground storage tank as described in claim 10 wherein said step of non-volumetrically detecting said leak comprises the step of remotely visually observing the presence of said liquid fill material within said interior space of said underground storage tank.

12. A method for detecting a leak in an underground storage tank as described in claim 11, wherein said liquid fill material comprises a liquid fill material having a color, and wherein said step of non-volumetrically detecting said leak comprises the step of remotely visually observing said color within said interior space of said underground storage tank.

13. A method for detecting a leak in an underground storage tank as described in claim 10 and wherein said step of non-volumetrically detecting said leak comprises the step of visually observing indicia of said liquid fill material within said interior space of said underground storage tank selected from the group consisting of streaks, marks, deposits, and any combination of the foregoing.

14. A method for detecting a leak in an underground storage tank as described in claim 10 wherein said step of non-volumetrically detecting said leak comprises the step of non-volumetrically detecting said leak with high resolution.

15. A method for detecting a leak in an underground storage tank as described in claim 14 wherein said step of non-volumetrically detecting said leak with high resolution comprises the step of controlling for a variable selected from the group consisting of inter-tank temperature difference, intra-tank temperature difference, inter-tank pressure difference, intra-tank pressure difference, tank deflection, barometric pressure, groundwater, and any combination of the foregoing.

16. A method for detecting a leak in an underground storage tank as described in claim 14 wherein said step of non-volumetrically detecting said leak with high resolution comprises the step of non-volumetrically detecting said leak with greater resolution as compared to volumetrically detecting said leak.

17. A method for detecting a leak in an underground storage tank as described in claim 16 wherein said step of non-volumetrically detecting said leak with greater resolution as compared to volumetrically detecting said leak comprises the step of non-volumetrically detecting said leak with greater resolution as compared to detecting said leak by observing a change in the level of a liquid fill reservoir of an underground storage tank.

18. A method for detecting a leak in an underground storage tank as described in claim 5 further comprising the step of removing liquid from said interior space with said remotely controlled device.

19. A method for detecting a leak in an underground storage tank as described in claim 18 wherein said step of removing liquid comprises the step of removing liquid with a vacuum of said remotely controlled device.

20. A method for detecting a leak in an underground storage tank as described in claim 18 wherein said step of removing liquid comprises the step of removing liquid that interferes with said step of non-volumetrically detecting said leak.

* * * * *